Patented Dec. 27, 1949

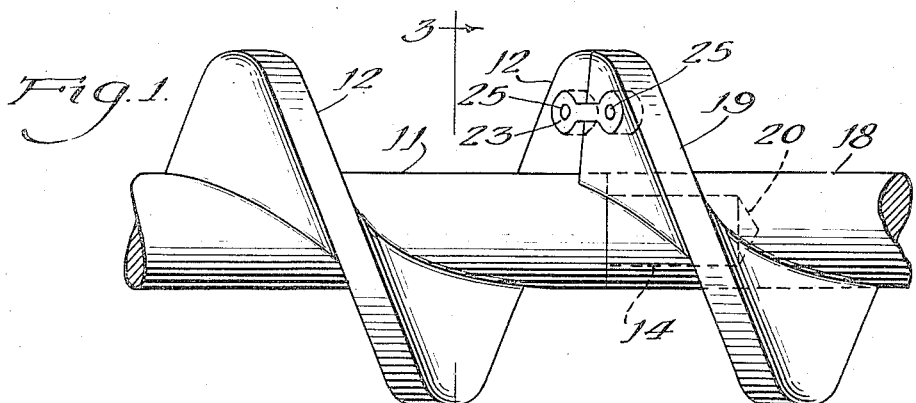
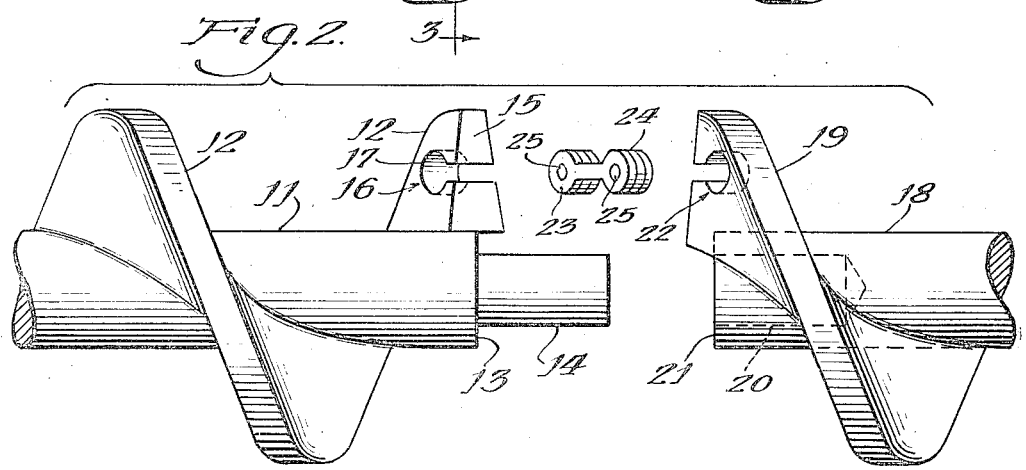
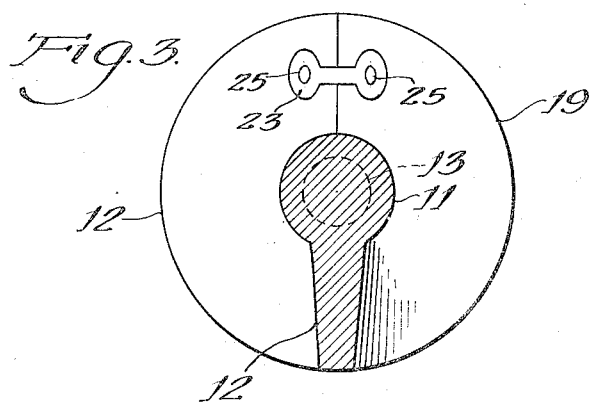

2,492,915

UNITED STATES PATENT OFFICE 2,492,915

CONVEYER SCREW

Arthur B. Carlson, Mendota, Ill., assignor to H. D. Conkey & Company, Mendota, Ill., a corporation of Illinois Application April 14, 1947, Serial No. 741,307

7 Claims. (Cl. 198—213)

This invention relates to improvements in conveyor screws and more particularly to a sectional, non-flexible conveyor screw suitable for use, for example, for moving coal in a stoker.

Manufacturers of certain types of coal stokers, and particularly those who manufacture bin-feed type stokers, have found it impractical to incorporate in their products coal conveyor screws of single piece construction. The expenses and difficulties encountered in the manufacturing, handling, installation, and servicing of the single piece units have made it expedient to use sectional screws in such applications.

Various schemes have been provided for applying power to sectional screws in such stokers, but a common difficulty has been experienced in all designs. When the direction of the travel of the coal is away from the point of power application, the thrust reaction against the movement of the coal tends to hold the screw sections together axially, but the torque reaction tends to twist said sections and to cause a separation of the ends of the flight on any one section from the ends of the flights on the next adjacent sections. On the other hand, when the direction of the travel of the coal is toward the point of power application, the torque reaction tends to hold the ends of the flights together when they are overlapped, but the thrust reaction tends to separate the section axially. It will thus be apparent that an adequate means for coupling said sections one to another is a necessity.

Sectional conveyor screws of prior construction have incorporated means for fastening the sections thereof together, but in all designs of which I am aware, said fastening means have impeded, more or less, the free movement of the conveyed material past the joints between said sections. Examples of such obstructions may be noted in designs for screws which have enlargements in the core shafts, exposed bolt or screw heads, or interruptions in the screw flight at said joints. Any obstructions of these or other types tends to cause the material being moved to pack, which in turn causes increased power consumption, promotes excessive degradation or grinding of said material, and often causes undue wear on the screws, conveyor tubes and the driving mechanisms.

To overcome this and other objectionable features common to earlier designs, I have devised the present sectional conveyor screw in which, on each section thereof, I provide a helical flight which terminates, at each of its respective ends, in a face which lies entirely within the contour of said flight and preferably within a plane substantially parallel to the axis of said section. Each of said faces is adapted to abut a like face on a next adjacent flight, and within each pair of said abutting faces I provide opposing slots which receive a connecting link which is disposed wholly within the contour of said adjacent flights and serves to secure said flights one to another and thus to connect said sections.

An important object of my invention is to provide a sectional conveyor screw having means disposed entirely within the contour of the flight thereof for connecting the sections of said screw in a way which provides an unbroken flight contour over which coal or other material may be caused to move without hindrance of any kind.

Another object of my invention is to provide such a conveyor screw which may be used for moving material either away from the point at which power is applied thereto or toward said point of application.

A further object of my invention is to provide a conveyor screw of the above character, the various sections of which are interchangeable and easily connected and disconnected.

Other objects and advantages of the invention will be apparent from the following description of a preferred embodiment thereof, taken in connection with the accompanying drawing in which:

Fig. 1 is a side elevational view of a portion of a sectional conveyor screw, constructed in accordance with the invention, showing the means for connecting the sections thereof one to another;

Fig. 2 is an exploded view of the same showing the relationship between the various parts thereof; and, Fig. 3 is a sectional view of said screw taken on the line 3—3 in Fig. 1.

Referring in detail to said drawing, a section of the conveyor screw comprises a core shaft 11 upon which is formed or attached, as by welding, a helical flight 12. The shaft has a flat end 13, at a right angle to the axis of the shaft, upon which may be formed an axial pin 14. Said flight 12 terminates adjacent to the end 13 in a flat face 15 which may lie, for example, in a plane intersecting the axis of said shaft 11 and at right angles to the helical flight. A laterally disposed key-hole shaped slot, shown generally at 16, is provided in the flight 12 and face 15, as is best illustrated in Fig. 2. Said slot extends completely through said flight and may have an enlarged portion 17 of general cylindrical shape having an axis disposed, for example, at a right angle to the surface of the flight adjacent to said slot.

A next adjacent section of the screw comprises a core shaft 18 and a flight 19 thereon, both of which should preferably have dimensions identical to those of the shaft 11 and flight 12. Said shaft 18 has a hole 20 in the end thereof which receives the pin 14 and provides a substantially perfect alignment of the two sections when end 21 of the shaft 18 and the end 13 of said shaft 11 are brought together to an abutting position.

The flight 18 terminates in a face parallel and identical to said face 15 and is positioned, with regard to the shaft end 21, so that the two faces may abut perfectly when said ends 13 and 21 are brought together as in Fig. 1. A key-hole slot, shown generally at 22, is provided in said flight 18 and in the face thereon corresponding in dimensions and position to those of the slot 16.

When the ends 13 and 21, and the two faces, are brought together as above said, the two slots 16 and 22 are directly opposite each other and a key 23, having dimensions corresponding to the combined interior dimensions of the two slots, may be driven into said slots to rigidly secure the two screw sections each to the other. Said key may be formed of alloy steel or non-ferrous material of single piece or laminated construction, and when of the latter design, the laminations 24 of said key may be held together by rivets 25, as illustrated in the Fig. 2. The surfaces of the flights 12 and 19 about the round portions of the two slots may be slightly countersunk if desired, and said link may be lightly peaned adjacent to said countersunk surfaces, after assembly of the sections, to firmly hold the link in proper position.

It will readily be understood that, with the conveyor screw sections attached in the manner hereinbefore described, all of mating parts thereof are flush with each other and that there are no projecting parts whatsoever which will tend to obstruct the passage of material over said sections or over the joints therebetween. When said material is moved by the screw toward the point at which power is applied to the latter, the torque supplied at said point will be transmitted from one section to another through the faces on the flights. During this operation, the link joining the sections will prevent an axial separation thereof which would otherwise occur because of the thrust reaction against the movement of said material. Furthermore, when said screw is used to move material away from said point of power application, the torque applied to said screw will be transmitted from one section to another by means of the link and, as hereinbefore explained, a thrust reaction tending to prevent an axial separation of the sections will be present. It will be seen, therefore, that the sectional screw of my invention may be used to move material in either direction regardless of the point thereon at which power is applied.

It will also be understood that, while I have illustrated and described only a portion of two sections of my conveyor screw, said screw may comprise any number of identical sections. The core shaft and flight of each of said sections may have one end thereof of a construction like that described above with regard to the shaft 11 and flight 12, and the opposite end of each section may be constructed as is that of the partially illustrated section which comprises the shaft 18 and the flight 19.

Since the corresponding ends of the various sections of said screws of like size and flight design are of identical dimensions, said sections are interchangeable, and worn sections may easily be replaced with other sections as desired. A screw section of such construction having a "right-hand" flight thereon, however, cannot be jointed to one having a "left-hand" flight; and, of desired, the key-hole slots may be positioned during manufacturing so that sections of screws of different diameters cannot be fastened together, thus making it impossible for a repair man to accidentally replace a section with one of improper size or design.

The foregoing detailed description has been given for clearness of understanding only, and no unnecessary limitations should be understood therefrom; but the appending claims should be construed as broadly as permissible in view of the prior art.

I claim:

1. A conveyor screw, comprising: a plurality of core shafts having abutting ends and a common axis; helical flights, one on each of said shafts; abutting faces on adjacent ends of said flights lying wholly within the contour of the latter; a slot in each of said abutting faces, one of said slots being opposite another; and, a link disposed entirely within said contour and adapted to be received by said opposing slots whereby said flights may be secured one to another without projections in said contour thereof, said abutting ends of the flights being flush without overlapping and the contour of the flights at the point of coupling being the same as elsewhere in their length to provide, in effect, a continuous flight of uniform contour and strength for the full length of the screw.

2. A conveyor screw, comprising: a plurality of core shafts having abutting ends and a common axis; helical flights, one on each of said shafts; abutting faces normal to the plane of said flights and lying wholly within the contour of the latter; a slot in each of said abutting faces, one of said slots being opposite another; and, a link disposed entirely within said contour and adapted to be received by said opposing slots whereby said flights may be secured one to another without projections in said contour thereof, said abutting ends of the flights being flush without overlapping and the contour of the flights at the point of coupling being the same as elsewhere in their length to provide, in effect, a continuous flight of uniform contour and strength for the full length of the screw.

3. A conveyor screw, comprising: a plurality of core shafts having abutting ends and a common axis; helical flights, one on each of said shafts; abutting faces on adjacent ends of said flights lying wholly within the contour of the latter; a key-hole slot in each of said abutting faces, one of said slots being opposite another; and, a link disposed entirely within said contour and adapted to be received by said opposing slots whereby said flights may be secured one to another without projections in said contour thereof, said abutting ends of the flights being flush without overlapping and the contour of the flights at the point of coupling being the same as elsewhere in their length to provide, in effect, a continuous flight of uniform contour and strength for the full length of the screw.

4. A conveyor screw, comprising: a plurality of core shafts having abutting ends and a common axis; helical flights, one on each of said shafts;

abutting faces on adjacent ends of said flights lying wholly within the contour of the latter; a slot in each of said abutting faces, one of said slots being opposite another and all of said slots being uniformly positioned relative to said axis; and, a link disposed entirely within said contour and adapted to be received by said opposing slots whereby said flights may be interchangeably secured one to another without projections in said contour thereof, said abutting ends of the flights being flush without overlapping and the contour of the flights at the point of coupling being the same as elsewhere in their length to provide, in effect, a continuous flight of uniform contour and strength for the full length of the screw.

5. A conveyor screw, comprising: a plurality of core shafts having abutting ends and a common axis; helical flights, one on each of said shafts; abutting faces on adjacent ends of said flights lying wholly within the contour of the latter; a key-hole slot in each of said abutting faces, one of said slots being opposite another and all of said slots being uniformly positioned relative to said axis; and, a link disposed entirely within said contour and adapted to be received by said opposing slots whereby said flights may be interchangeably secured one to another without projections in said contour thereof, said abutting ends of the flights being flush without overlapping and the contour of the flights at the point of coupling being the same as elsewhere in their length to provide, in effect, a continuous flight of uniform contour and strength for the full length of the screw.

6. A conveyor screw, comprising: a plurality of core shafts having abutting ends and a common axis; a projection on an end of one of said shafts and a recess in an end of another of said shafts adapted to receive said projection; helical flights, one on each of said shafts; abutting faces on adjacent ends of said flights lying wholly within the contour of the latter; a slot in each of said abutting faces, one of said slots being opposite another; and, a link disposed entirely within said contour and adapted to be received by said opposing slots whereby said flights may be secured one to another without projections in said contour thereof, said abutting ends of the flights being flush without overlapping and the contour of the flights at the point of coupling being the same as elsewhere in their length to provide, in effect, a continuous flight of uniform contour and strength for the full length of the screw.

7. A conveyor screw, comprising: a plurality of core shafts having abutting ends and a common axis; a projection on an end of one of said shafts and a recess in an end of another of said shafts adapted to receive said projection; helical flights, one on each of said shafts; abutting faces normal to the plane of said flights and lying wholly within the contour of the latter; a key-hole slot in each of said faces, one of said slots being opposite another and all of said slots being uniformly positioned relative to said axis; and, a link disposed entirely within said contour and adapted to be received by said opposing slots whereby said flights may be interchangeably secured one to another without projections in said contour thereof, said abutting ends of the flights being flush without overlapping and the contour of the flights at the point of coupling being the same as elsewhere in their length to provide, in effect, a continuous flight of uniform contour and strength for the full length of the screw.

ARTHUR B. CARLSON.

REFERENCES CITED

The following references are of record in the file of this patent:

UNITED STATES PATENTS

| Number | Name | Date |
|---|---|---|
| 793,958 | Richardson | July 4, 1905 |
| 2,118,289 | Birkenbeuel | May 24, 1938 |
| 2,142,896 | Harman | Jan. 3, 1939 |
| 2,308,075 | Hahn | Jan. 12, 1943 |